Sept. 28, 1943.   A. G. EVANS   2,330,272
AGRICULTURAL IMPLEMENT
Filed Dec. 31, 1940   2 Sheets-Sheet 2
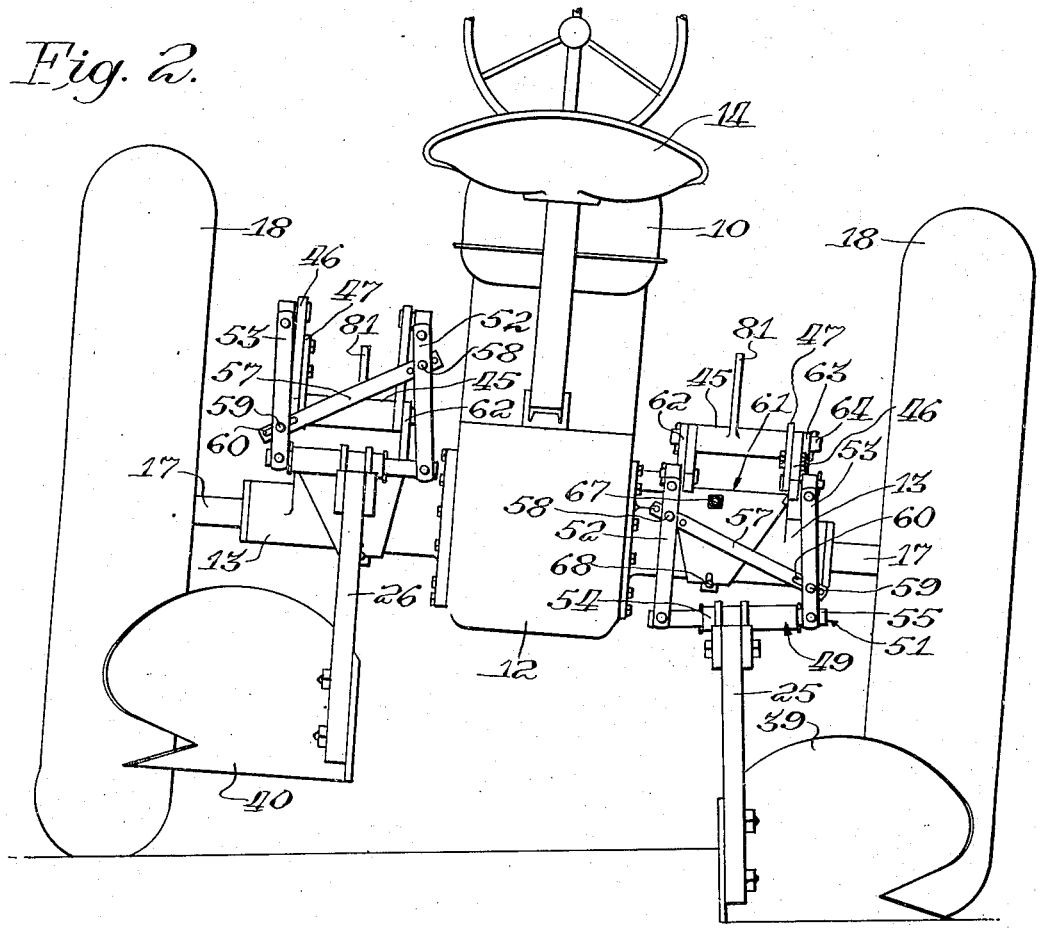
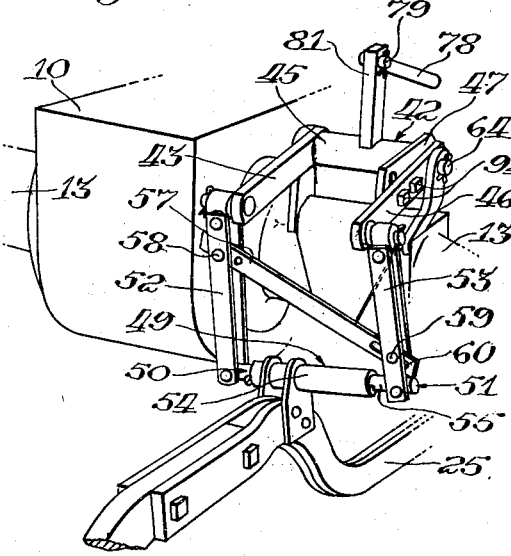
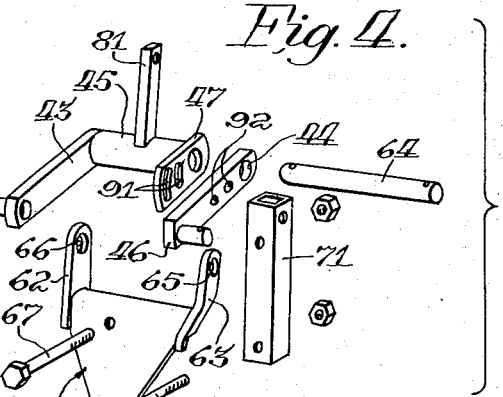
Inventor
Arthur G. Evans
By Paul O. Pippel
Atty.

Patented Sept. 28, 1943

2,330,272

UNITED STATES PATENT OFFICE 2,330,272

AGRICULTURAL IMPLEMENT

Arthur G. Evans, Canton, Ill., assignor to International Harvester Company, a corporation of New Jersey Application December 31, 1940, Serial No. 372,593

1 Claim. (Cl. 97—47)

This invention relates to agricultural implements and more particularly to such implements which are adapted to be directly connected to a tool-supporting means or tractor for movement to and from their working positions. Still more particularly, the invention relates to a lifting means for a two-way plow attachment.

It is an object of the present invention to provide in a two-way plow attachment a simple combined lifting and lateral stabilizing arrangement adapted to be wholly located on the transversely extending rear axle housings of the tractor.

It is another object of the invention to provide a common fastening means for the attachment of the support for lifting arm means and for the fluid actuated cylinder device.

According to the present invention, there has been provided a yoke member adapted for attachment to the transverse rear axle housing of the tractor which serves as means for the mounting of a rockable lifting structure having spaced arms thereon and by which the tool beam structure is stabilized against lateral tilting while in its working position. On the tool beam structure there are laterally spaced locations which are respectively connected by link means to the spaced arm portions of the rockable structure. During the plowing operation, the tool beam structure will react against the rockable means and in that way be stabilized against lateral tilting. This rockable structure also serves as a part of the lifting means and is adapted to be rocked by a fluid-actuated cylinder device extending parallel with the body portion of the tractor and which is connected to the rear axle structure by the same fastening means that connects the yoke to the rear axle housing. The rockable structure has one of its arms adjustable for initially laterally leveling the plow beam and its plow. Each of the plow beam structures of the two-way plow has individual rockable structures and these rockable structures are conveniently connected to the rear axle housing at the respective sides of the longitudinal body portion of the tractor for respectively lifting the right and left-hand plow beam structures.

For other objects and for a better understanding of the invention, reference may be had to the following detailed description taken in connection with the accompanying drawings, in which:

Figure 2 is a rear view of the tractor and of the plowing attachment showing one of the plows in its working position while the other is in the position of transport;

Figure 3 is a perspective view of the rear portion of the lifting and stabilizing means forming the principal feature of the present invention; and Figure 4 is an exploded view of the parts making up the lifting arm means, the yoke means, and the means for attaching the yoke to the tractor.

Figure 1:
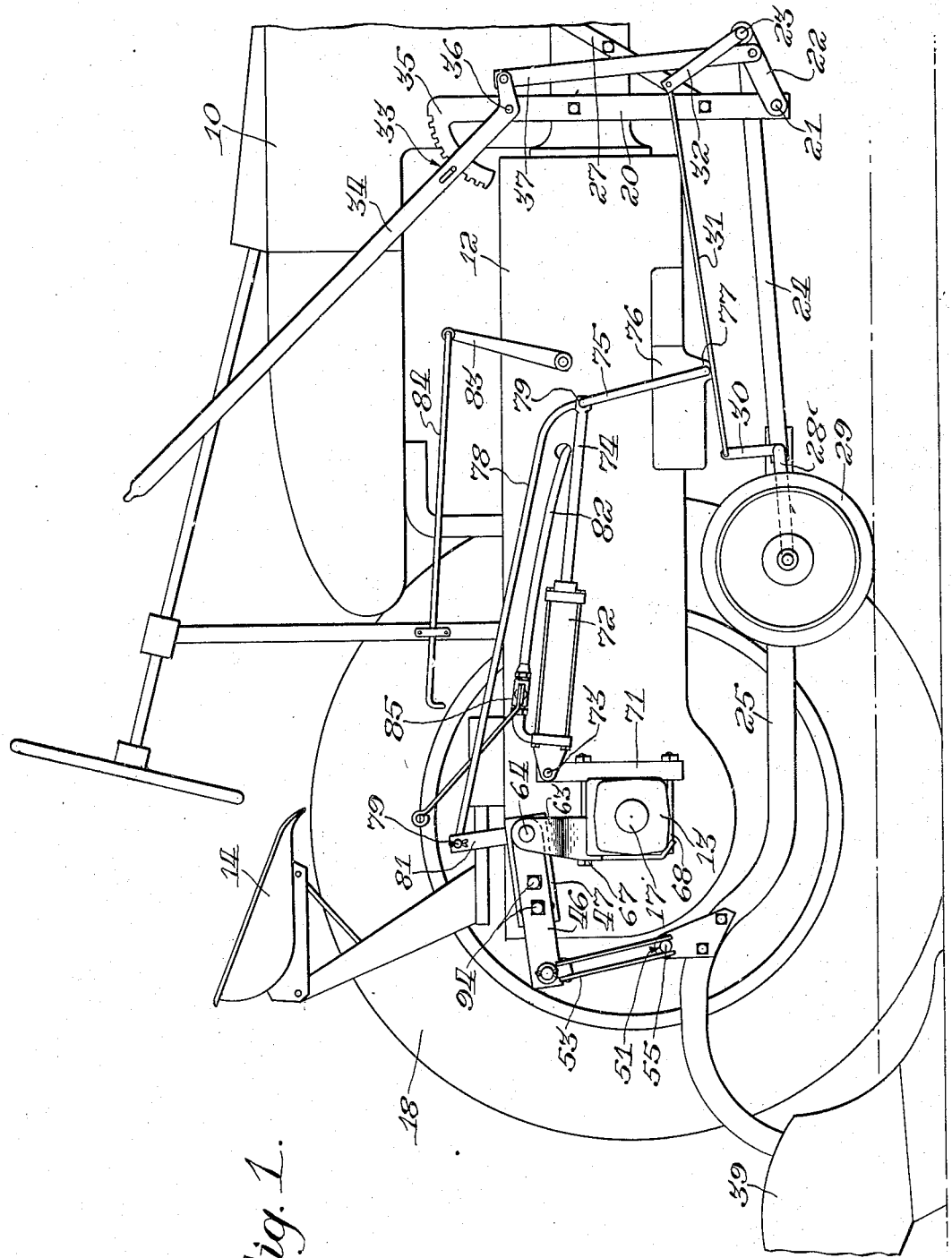
Figure 1 is a side elevational view of a portion of the tractor having one of the tractor wheels removed and with the plow attachment incorporating the features of the present invention attached thereto.

Referring now particularly to Figure 1, there is shown a tool-supporting means illustrated as a tractor 10 having a longitudinally extending body portion 12 and laterally extending rear axle housings 13 located at the side of the tractor and extending from the rearward portion of the longitudinal body portion 12. On the rear of the body portion 12 is an operator's station 14 from which the tractor and the implement parts can be controlled. Through the rear end of the body portion 12 and through the rear axle housings 13, there extend rear driving axles 17 adapted for driving wheels 18 mounted on the axles.

Connected to the body portion 12 considerably forward of the rear axle structure and at each side of the tractor, is a depending member 20, to which is pivotally connected on the lower end thereof and at 21 a forwardly extending bail structure 22 having a transversely extending shaft portion 23. This transverse portion 23 serves as a means to which is connected a drag link structure 24, to the rear end of which is pivotally connected a beam structure 25. The depending member 20 may be braced by a member 27.

Since the plow beam arrangement on the opposite side is similar to the arrangement of the plow beam on the right-hand side of the tractor, the description will be directed and reference numerals will be applied only to the arrangement located on the right-hand side of the tractor.

At the intersection of the tool beam structure 25 with the draft link 24, there is connected a crank arm 28 on the free end of which is connected a gauge wheel 29. From the crank arm there extends vertically an arm 30 which is connected by a link 31 to an arm 32 rigidly connected to the transverse shaft portion 23 of the bail structure 22. The shaft portion 23 is rotatable and any vertical movement of the bail structure 22 which may be effected by the manual adjusting means 33, will be imparted through the link 31 to the gauge wheel 29. The adjusting means 33 includes a lever rockable over a quadrant 35 formed on the upper end of the vertically extending member 20. The lower end of the adjusting lever 34 is pivoted at 36 to the member 20 and is connected by means of a link 37 for effecting vertical movement of the bail means 22 about its pivotal connection 21 with the lower end of the vertically extending member 20. In this manner, the gauge wheel 29 can be properly adjusted for the positioning of the forward end of the tool beam structure 25 with respect to the ground to be plowed. In other words, the gauge wheel 29 serves to regulate the suck of the plow and consequently the plowing depth of the same.

On the rear end of the tool beam structure 25 there is connected a right-hand bottom 39 adapted for throwing the furrow slice of the plow toward the right as the tractor traverses the field being plowed. It will also be apparent that on the opposite side of the tractor there is connected to the tool beam structure 26 a left-hand plow bottom 40 adapted for throwing the furrow slice toward the left as the tractor traverses the field being plowed. As is well known, in these two-way plow attachments only one of the plows is used at one time, there being thereby alternate operation of the plow bottoms depending upon which direction the tractor is passing across the field and the direction to which the furrow slice is to be thrown.

Referring now particularly to the combined lifting and stabilizing means such as shown more in particular in Figures 3 and 4, it will be noted that there has been provided such a means which may be supported entirely upon a transversely extending housing or portion. There are two of such means, one at each side of the tractor and respectively on the axle housings 13. Each of said means includes a rockable structure or arm means indicated generally at 42, which includes a pair of spaced arms 43 and 44 arranged to extend rearwardly from a sleeve portion 45, to which they are rigidly secured. The arm portion 44 is of two parts, a long arm 46 and a short arm 47, with respect to which the long arm 46 is angularly adjustable. The purpose of this adjustment means will be described hereinafter, but it is sufficient for the present to note that the arm means 44 is equally as effective as the arm 43.

On the plow beam structure 25 there is provided a transversely extending structure 49 adapted to provide transversely spaced portions 50 and 51, to which the arms 43 and 44 may be respectively connected by depending link structures 52 and 53. These link structures 52 and 53 are so connected to the portions 50 and 51 as to permit pivoting of the lower ends of the links in a vertical plane with respect to the transverse structure 49. The transverse structure 49 includes a sleeve 54, through which is connected or inserted for rotative movement therein, a shaft 55. It will be apparent that rotation of the link structures in a longitudinal vertical plane with respect to the transverse structure may be effected. This movement is particularly necessary when the plow beam structure 25 is to be lifted to a transport position. The link structures 52 and 53 are similarly connected for universal movement with the free ends of the respective arm portions 43 and 44 of the rockable structure 42, except that there are separate shafts on each arm. In order to limit the vertical swinging movement in a transverse vertical plane of the link structures 52 and 53, there is provided a diagonally extending stop means 57 pivotally connected to the link structures 52 and 53 and arranged in its connection with the link structure 53 to provide for a pin 59 on the link structure 53 to extend through a slot 60 in the lower end of the diagonal limiting means 57. As the pin 59 abuts either end of the slot, the transverse movement of the tool beam structure 25 with respect to the rockable structure 42 will be limited.

As means for mounting the rockable structure 42 on the axle housing, there is provided a yoke member 61 having transversely spaced portions 62 and 63. The rockable structure is positioned so that the sleeve 45 thereof is in alinement between the portions 62 and 63 for the purpose of receiving an attaching pin 64 extending through openings 65 and 66 in the upper ends of the spaced portions 62 and 63 and through the sleeve 45, for the purpose of making the rockable structure 42 fast to the yoke means 61 for rockable movement with respect thereto, and about the connecting pin 64.

The yoke means 61 includes a body portion shaped for attachment to the rear face of the axle housing and adapted to be fastened thereto by means of long bolts 67 and 68 of sufficient length to extend beyond the front face of the axle housing and through a vertically extending member 71, which serves as a clamping plate and as means for the connection of a fluid-actuated cylinder 72 to the transverse axle housing 13, as indicated at 73. The fluid-actuated device 72 includes a piston rod 74 adapted for attachment to the free end of a fore and aft movable supporting hinge 75 pivoted to a fluid reservoir housing and pump structure 76 at 77. It should thus be apparent that the fluid-actuated device 72 is arranged parallel with the body portion 12 and is so supported that it may be extended, the extension of which will serve to move forwardly a connecting link 78 connected at 79 to the common connection of the piston rod 74 to the supporting hinge 75 and at its rear end to a vertically extending arm 81 rigid with the sleeve 45 of the pivotal structure 42. As the fluid-actuated device 72 is extended, the same reacting against the vertical attaching member 71 at 73, the rockable structure 42 will be rocked about the pin 64 in a clockwise direction, thereby imparting lifting movement to the plow beam structure 25 to place the plow beam structure in position for transport over the road, or while the other plow is being used.

The pump and reservoir structure 76, which is partially fitted within the body portion 12, includes a pump adapted to be driven by the tractor motor for the purpose of delivering fluid through a fluid communication 82 to the fluid-actuated device 72. The main control means for the pump is that of a lever 83 pivoted on the housing 76 and extending through the wall of the body portion 12. On the upper end of the lever 83 there is connected a rearwardly extending actuating rod 84, which extends rearwardly to a location near to the operator's station 15, whereby the lever 83 may be readily operated by the operator. When the lever 83 is in one of its positions, fluid would be caused to pass through the fluid communication 82 to the fluid-actuated device 72, providing an actuating valve 85 in the fluid communication 82 is set to its open position.

On the opposite side of the tractor, there is a similar fluid-actuated device adapted to be connected by a similar fluid communication to the reservoir housing 76, and the flow of fluid thereto is similarly controlled by the lever 83; likewise the fluid communication on that side of the tractor may have a valve similar to the valve 85.

The hydraulic arrangement may be similar to the arrangement shown in the pending application of Carl W. Mott, Serial No. 357,879, filed September 23, 1940, wherein there is a separate valve control means for each individual fluid-actuated device and a generally hydraulic control lever for directing fluid to the particular fluid-actuated device having its valve in the open position.

When the fluid-actuated device 72 has been extended and the valve 85 has been moved to a closed position, the tool beam structure 25 will be retained in its raised position by the fluid within the fluid-actuated device. When it is desired to lower the plow beam structure 25 to its working position, the valve means 85 may be opened and the fluid from the fluid-actuated device 72 will be returned to the reservoir housing 76. Similarly controlled are the fluid-actuated devices on both sides of the tractor and by this means one can be retained in its raised position while the other is in its working position, the main control serving to initiate the flow of fluid to the fluid-actuated device for the tool beam structure in its lowered position. By such an arrangement the operator may select for operation one or the other of the plow beam structures.

As a means for effecting lateral leveling of the plow beam structure and of the plow with respect to the bottom of the furrow, there is provided an angular adjustment between the short arm 47 and the long arm 46. The short arm 47 has a pair of arcuate slots 91, while the long arm has a pair of holes 92 adapted to receive tightening bolts 94. It should be apparent that, since the long arm 46 is independently pivotable on the shaft 64, the long arm can be rotated with respect to the short arm and the bolts 94 may change their position in the slots 91 of the short arm 47. By so adjusting these arms with respect to each other and by means of the link structures 52 and 53 and the transverse structure 41, the tool beam structure 25 and its plow tool 39 may be laterally tilted. While in the plowing operation, the plow beam structure, through the transverse structure 49, link structures 52 and 53, and rockable structure 42, is stabilized while in its plowing position; that is, the plow beam will always be retained in its vertical upright position.

It should now be apparent that there has been provided a simple arrangement for the connection of alternate plow beam structures to a tractor, wherein each plow beam has its individual lifting means and supporting structure therefor. In such an arrangement the plow beams are definitely located beneath the transverse axle structure at the respective sides of the tractor. The rear end of the body portion of the tractor is thereby substantially free from structural encumberances. It also should be apparent that means for fastening the rockable combined lifting and stabilizing structures is common with the means for the attachment of the fluid-actuating devices, which form a part of the lifting means.

While various changes may be made in the detail construction of the present invention, it shall be understood that such changes shall be made within the spirit and scope of the invention as defined by the appended claim.

What is claimed is:

In combination, a tractor having a longitudinally extending body portion, a transverse portion extending laterally from the body portion, a longitudinally extending working tool beam connected to the body portion for vertical movement and adapted to extend beneath the transverse portion, means for lifting the tool beam including arm means connected with the tool beam, means in the form of a yoke for mounting the arm means on the transverse portion for rocking movement, the arm means being disposed between the spaced portions of the yoke, a fluid-actuated device arranged generally parallel with the longitudinally extending body portion and connected to the arm means to effect rocking of the same, and common means for securing the yoke means and the fluid-actuated device to the transverse portion.

ARTHUR G. EVANS.